Jan. 2, 1968        W. D. ROBERTSON        3,361,655
       PROCESS FOR MAKING CARBON BLACK FEED FROM
              CRACKED HYDROCARBON OILS
                 Filed July 14, 1965
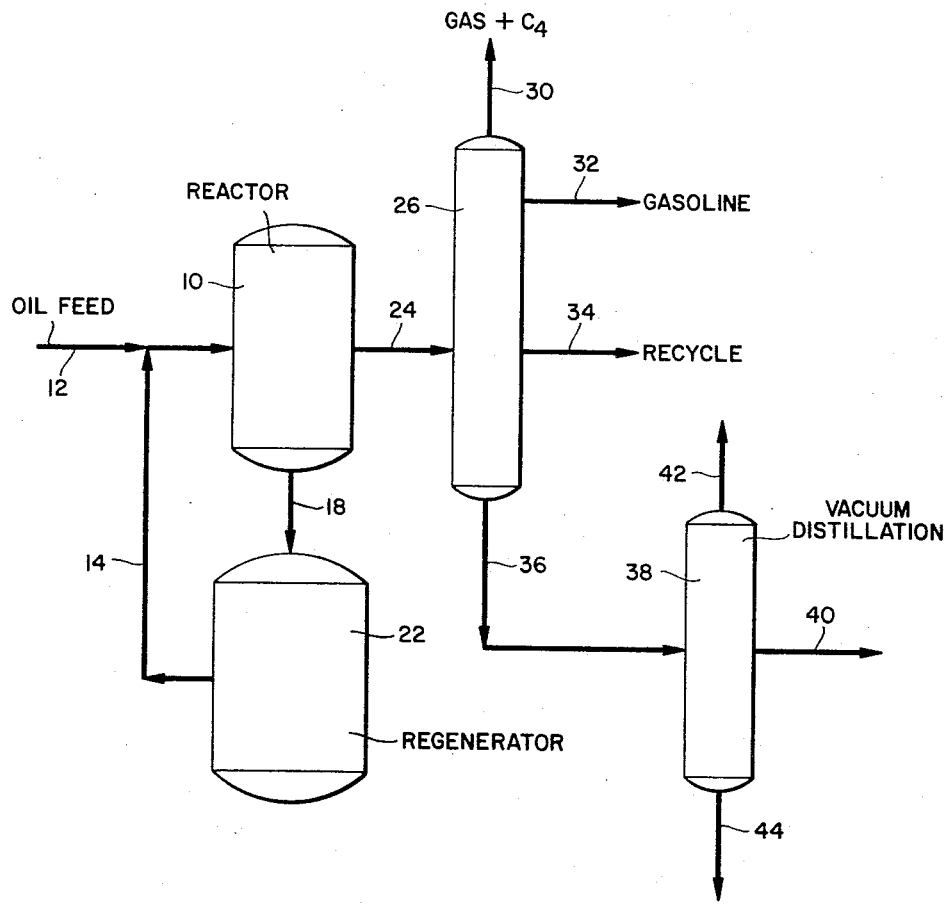
WARREN D. ROBERTSON   INVENTOR
BY *George J. Albany*
PATENT ATTORNEY

United States Patent Office 3,361,655
Patented Jan. 2, 1968

3,361,655
PROCESS FOR MAKING CARBON BLACK FEED FROM CRACKED HYDROCARBON OILS
Warren D. Robertson, Sarnia, Ontario, Canada, assignor to Esso Research and Engineering Company, a corporation of Delaware
Filed July 14, 1965, Ser. No. 471,838
8 Claims. (Cl. 208—100)

This invention relates to a process for making carbon black feedstocks. Oil feedstocks for carbon black manufacture must be highly aromatic and have low ash and asphaltene contents. The Bureau of Mines Correlation Index (BMCI) is used as an index of feedstock aromaticity by most carbon black manufacturers.

The Bureau of Mines Correlation Index is $$BMCI = 100\left[\frac{876}{50\% \text{ boiling point} + 460°F.} + \frac{670}{131.5 + °API} - 4.568\right]$$

A minimum BMCI of 130, 5 to 8% maximum of asphaltenes and 0.05% maximum ash content are typical specifications for carbon black feed. Low BMCI oils give much lower yields of carbon black than high BMCI oils and are therefore much less desirable.

High boiling hydrocarbon fractions obtained from catalytic cracking of gas oils, generally hydrocarbons boiling above about 650° F., known as fractionator bottoms, heavy catalytic cycle stock or catalytic clarified oil, have previously been used as carbon black feed either as produced or after thermal cracking. However, the Bureau of Mines Correlation Index (BMCI) of these oils is much below the current requirements and the 10–15% asphaltene content after thermal cracking of these oils is too high.

Feedstocks for making carbon black by the oil furnace process must conform to a relatively narrow range of properties not usually found in petroleum refinery streams. Because the yield of black is relatively low (2.5–5 lb./U.S. gallon of feed), a low cost feedstock in the price range of heavy distillate and residual fuel oils is required if an adequate return is to be obtained on the large investment required for a carbon black plant. Uniformity of the feedstock from an individual supplier is as important as high quality.

True carbon black is formed by vapor phase cracking polymerization and/or condensation of hydrocarbons Both the formation of the solid carbon nuclei, and their subsequent growth into particles of carbon black must occur directly from the vapor phase. Liquid phase cracking results in the formation of bulk carbon or coke which appear as large particles of grit in the carbon black product. Grit adversely affects the rubber reinforcing properties of the black. Complete vaporization of the feedstock is therefore a primary requisite in making high quality carbon black.

To limit the possibility of liquid phase cracking, the oil should be completely vaporizable in a very short time, about 0.1 second or less, at the usual furnace conditions of 2500–2700° F. and very low hydrocarbon partial pressure. Hydrocarbons having molecular weights up to about 500 satisfy this requirement.

It is important that the oil feed contain a minimum of asphaltenes and other high molecular weight resins which are relatively non-volatile and are therefore subject to liquid phase cracking. Asphaltenes contribute to preheater coking and to grit in the carbon black product. Similarly, free carbon can be tolerated only in very small concentrations. For these reasons distillate oils boiling above about 350° F. are preferred over residual stocks as carbon black feedstocks.

The most important requirement for carbon black feedstock is that it be highly aromatic. Aromatic hydrocarbons contain a larger proportion of carbon than paraffins. In addition, large compact molecules with many double bonds and short side chains have a greater tendency to polymerize and eventually to form carbon than long straight chain molecules which tend to crack into smaller fragments. Thus, both their elemental composition and the nature of the reactions which they undergo in a carbon black furnace result in higher yields of carbon black from aromatic hydrocarbons than from paraffins.

The carbon black industry uses several criteria to measure feedstock aromaticity, including the hydrogen/carbon ratio and the Watson-Nelson Characterization Factor, but the most widely used is the U.S. Bureau of Mines Correlation Index (BMCI). The BMCI, like the Characterization Factor is a function of the specific gravity and boiling point of the oil. The BMCI increases with increasing aromaticity and is a reasonably good indicator of carbon black yield. Although there are exceptions, high BMCI oils generally give the highest yield of black.

Straight chain hydrocarbons which have little tendency to smoke and produce carbon when burned have very low BMCI's. The same is true for those compounds having a single aromatic or naphthene ring. Compounds having two or more fused rings have very high BMCI's, which increase with both the number of rings and the degree of condensation. Compounds containing aromatic rings have higher BMCI's than those with a corresponding number of naphthene rings.

The aromaticity of the feedstock influences the properties as well as the yield of the carbon black product. While a wide range of black particle sizes can be obtained from almost any feedstock by adjusting the furnace conditions, the structure of the black is determined largely by the aromaticity of the feedstock. The concentration of aromatics in the fuel determines the rate at which carbon black nuclei are formed in the combustion flame. The rate of formation of nuclei is higher for highly aromatic feedstocks, and this results in carbon black with very small particle size and high structure.

For any combination of black properties the yield is always higher from aromatic than from less aromatic feedstocks. The high structure small particle size blacks required to obtain good vulcanizate properties from synthetic rubbers are obtained in lower yields than the coarser blacks, so a highly aromatic fuel is required to give economically acceptable yields. The trend is, therefore, to feedstocks which contain a very high proportion of polynuclear aromatics.

When the oil furnace process for making carbon black was first developed, oils with relatively low BMCI (below 120 and frequently below 100) were used as feedstocks. More recently oils with a higher BMCI have become available and have displaced the lower BMCI oils because high BMCI oils give higher yields of carbon black. This is particularly important for making the small particle size high abrasion grades of carbon black because the yield of carbon black is lower for these types than for the larger particle size blacks.

Typical specifications for carbon black feedstock now require a minimum BMCI of 130. The other critical requirement is that the carbon black feed oil contain not more than 8% and in some cases not more than 5% of asphaltenes. The asphaltenes are undesirable components in carbon black feed because they are relatively non-volatile and crack in the liquid phase to form grit in the carbon black product. Grit impairs the reinforcing and abrasion resistance properties of the carbon black product.

Phenol or furfural extracts of catalytic fractionator bottoms are known to be good carbon black feeds, but the manufacturing cost of the extraction process is high. Other prior processes disclose the manufacture of aromatic oils for making carbon black but the BMCI is below about 90. These oils are satisfactory for the production of certain oil blacks, such as, for example, large particle size oil furnace blacks:

FEF—(Fast Extruding Furnace particle size=41 m$\mu$ oil absorption=1.37 cc./g.)
GPF—(General Purpose Furnace particle size=53 m$\mu$ oil absorption=0.98 cc./9.)

but are unsatisfactory for making the small particle size, high structure carbon blacks:

HAF—(High Abrasion Furnace particle size=29 m$\mu$ oil absorption=1.30 cc./g.)
ISAF—(Intermediate Super Abrasion furnace particle size=25 m$\mu$ oil absorption=1.40 cc./g.)
SAF—(Super Abrasion Furnace particle size=19 m$\mu$ oil absorption=1.51 cc./g.)

which are required to give good reinforcement and abrasion resistance in synthetic rubbers. "Structure" is the linking together of carbon black particles into chains. "High structure" means that the particles are linked together in long chains.

It has been found that the bottoms fraction from high severity catalytic cracking is unique in that its highly aromatic (high BMCI) components are concentrated in the highest boiling point fractions. The catalytic cracking step must be at a high severity. This result was unexpected as was found ont when the BMCI of 5% distillate fractions of catalytically cracked fractionator bottoms from a high severity operation were compared with those of (1) catalytically cracked fractionator bottoms from a low severity (conventional) operation, and (2) an aromatic extract from a lubricating oil distillate as functions of their boiling points. In both the aromatic extract and catalytically cracked fractionator bottoms from a low severity operation, there is a relatively small increase in the BMCI of the oil as its boiling point is increased. However, the BMCI of the catalytically cracked fractionator bottoms from the high severity operation increases markedly as the boiling point increases.

The data for the aromatic extract and the conventional catalytically cracked fractionator bottoms indicate that, in general, the aromatic constituents of high boiling virgin and catalytically cracked oils are fairly evenly distributed throughout the boiling range and cannot be separated from the non-aromatic constituents by distillation. A process which differentiates between molecular types rather than molecular weight (i.e. boiling point) is required. Extraction with phenol or furfural is such a process which has been used to make high BMCI carbon black feedstocks from catalytically cracked fractionator bottoms or catalytic cycle stocks.

The present invention discloses that, contrary to what might be expected by analogy with virgin or conventional catalytically cracked stocks, high BMCI carbon black feed may be made by vacuum distillation of catalytically cracked fractionator bottoms obtained from high severity catalytic cracking. This process has a distinct advantage over the conventional solvent extraction process because it requires lower plant investment and has lower operating costs.

In the process of the present invention, a catalytically cracked fractionator bottoms fraction from high severity catalytic cracking is distilled under vacuum to obtain a heart-cut fraction boiling between about 700° F. and 1050° F. and which has a minimum BMCI of about 125 and preferably 130. The less aromatic components are recovered in the fraction boiling below 700° F. and the asphaltenes, resins and catalyst fines present in the cracked oil remain in the residue.

The catalytically cracked fractionator bottoms may be thermally cracked prior to the vacuum distillation step. This is a desirable but not a necessary step. It increases the potential yield of 130 BMCI oil by causing dealkylation of alkyl aromatics and cracking of non-aromatics to products boiling below the carbon black feed boiling range.

The high severity catalytic cracking of a virgin gas oil in this invention includes cracking at a temperature above about 925° F. to have a conversion to at least 55% and preferably 60% (corrected 430° F.), which means that at least 55% of the gas oil feed is converted to products boiling below 430° F. The conversion may be as high as 75%.

In the drawing, the figure diagrammatically represents one form of apparatus adapted to be used in carrying out the present invention.

Referring now to the drawing, the reference character 10 diagrammatically designates a reactor for carrying out catalytic cracking of hydrocarbons such as gas oil, certain crude oils and other relatively high boiling hydrocarbon stocks, preferably boiling between 600° and 1000–1100° F. The oil, preferably in a preheated condition, is introduced into the reactor through line 12. Hot regenerated catalyst at a temperature of about 850°–1150° F. is introduced into line 12 to line 14. In a fluid catalyst operation the catalyst to oil ratio fed to the reactor 10 may vary between about 5 to 20. The temperature in the reactor 10 may be between about 850° and 1000° F. In a fluid process the weight of oil per hour per weight of catalyst (which is expressed as w./hr./w.) in the reactor is usually between about 1 and 10, but may be higher. The catalyst is preferably silica-alumina catalyst but other cracking catalysts such as silica-magnesia, acid treated bentonitic clays etc. may be used. In fluid operations the catalyst is finely divided with the majority of the particles being between about 20 and 100 microns. Ground or micro-spherical catalyst particles of different size ranges may be used. The present invention may also be used with fixed bed or moving bed processes.

Spent catalyst from the reactor 10 is passed through line 18 to regenerator 22 wherein the temperature is maintained between about 1000° F. and 1200° F. to burn off carbonaceous deposits or coke from the catalyst and the regenerated catalyst is then returned to the reactor through line 14.

The cracked vapors pass from reactor 10 through line 24 into fractionating tower 26 wherein the reaction products are fractionated to recover desired products including $C_3$–$C_4$ gases, gasoline, and heating oil. Cyclone separators (not shown) in the reactor 10 separate catalyst from the cracked vapors leaving the reactor.

The vaporous cracked products are fractionated in the fractionator 26 to separate gases taken overhead through line 30, a $C_5$-430° F. gasoline taken as a side stream through line 32, a recycle fraction (430° F.–650° F.) taken as a side stream through line 34 at a lower region from the fractionator 36 and a bottoms 650° F.+ fraction taken through line 36. The recycle fraction may be in part withdrawn as a heating oil but is preferably recycled to feed inlet line 12.

The 650° F.+ bottoms fraction is passed to vacuum distillation tower 38 which is maintained under a pressure below about 100 mm. of mercury absolute pressure and at a temperature between about 900° F. and 475° F. In the laboratory the pressure was as low as 0.5 to 10 mm. of mercury to avoid thermal cracking but in the plant or in commercial operation this lower pressure can be between about 30 and 100 mm. of mercury. In the vacuum tower a side stream or heart-cut is taken off through line 40 and this stream has a boiling range between about 700° and 1050° F. and is removed and recovered as the carbon black feed of the present invention. This carbon black feed comprises between 15 and 70 liquid volume percent of the feed to vacuum distillation. An overhead fraction from vacuum tower 38 is taken through line 42. This overhead fraction has a boiling range between about 650° F. and 850° F. and may be recycled to oil feed line 12 or may be otherwise disposed of.

The bottoms fraction or pitch is withdrawn through line 44 and as it has a boiling range above about 950° F. it may be used as fuel or for any other desired purpose.

As pointed out above the catalytic cracking of virgin gas oil must be carried out a high severity to obtain carbon black feed of the quality currently required. The BMCI's of narrow boiling distillate fractions from high and low severity catalytic cracking are compared in the following Table 1. From this table it is apparent that the residue from low severity cracking has a relatively low constant BMCI throughout most of its boiling range while that from the high severity cracking contains very high BMCI oils, particularly in the fractions boiling above 900° F.

TABLE 1.—BMCI OF DISTILLATES FROM HIGH BOILING VIRGIN AND CATALYTICALLY CRACKED OILS

| Oil | Aromatic Extract from Lubricating Oil Distillate | Cat Fractionator Bottoms | |
|---|---|---|---|
| | | Catalytic Cracking Conditions | |
| | | Low Severity | High Severity |
| | | Feed Gas Oil: | |
| | | Gravity, °API_____ 24.2 | 23.6 |
| | | AR [1]_____ 12.8 | 14.1 |
| | | NR [2]_____ 35.6 | 37.1 |
| | | Reactor Temp., °F_____ 930 | 952 |
| | | Recycle, percent of Fresh Feed__ 64 | 70 |
| | | Conversion (Corr. 430), percent__ 48 | 61 |
| | | Cat Fractionator Bottoms: Gravity, °API_____ 12.6 | 1.1 |
| BMCI_____ | 87 | 75 | 115 |

BMCI OF DISTILLATE FRACTIONS

| Average Boiling Point, °F.: | | | |
|---|---|---|---|
| 750_____ | | 68 | 81 |
| 800_____ | 74 | 69 | 91 |
| 850_____ | 78 | 69 | 107 |
| 900_____ | 86 | 70 | 120 |
| 950_____ | 91 | 76 | 142 |
| 1,000_____ | | 91 | 160 |

[1] Percent of carbon atoms in aromatic ring structures.
[2] Percent of carbon atoms in naphthene ring structures.

In laboratory experiments, catalytic fractionator bottoms fractions were heated for one minute or a few minutes at 800° F. or 900° F. by pumping the fraction through a heated pipe coil and then quickly cooled to a temperature of about 350° F. the cooling was done so residence time at high temperature would be about the same as in a pipestill. This operation was carried out to simulate the condition of the fractionator bottoms after heating to the vacuum distillation temperature in a pipestill furnace. The heat treated fractionator bottoms fractions were each then distilled under vacuum at an absolute pressure of 0.5 to 5 mm. and heart-cut distillate carbon black feedstock fractions were recovered. The laboratory distillations were carried out under lower absolute pressure than in refinery pipestill distillations to avoid further thermal cracking. The thermal treatment prior to distillation corresponds to thermal treatment which would occur when vacuum distilling in the plant. Inspections of the feedstocks used and the catalytic cracking conditions under which they were produced are shown in the following Table 2. Sample C was vacuum distilled in the laboratory without thermal treatment but it was heated to 800° F. in a plant test run.

TABLE 2.—INSPECTIONS OF CAT FRACTIONATOR BOTTOMS FROM HIGH SEVERITY CATALYTIC CRACKING

| Sample | A | B | C |
|---|---|---|---|
| Cat Cracker Operation: | | | |
| Feed Gas Oil: | | | |
| Gravity, °API | 23.6 | 23.5 | 24.3 |
| AR [1] | 14.1 | 13.2 | 12.4 |
| NR [2] | 37.1 | 36.7 | 35.5 |
| Reactor: | | | |
| Temperature, °F | 952 | 936 | 925 |
| Recycle, Percent of Fresh Feed | 70 | 56 | 50 |
| Conversion (Corrected 430° F.), Percent | 61.2 | 59.3 | 65.5 |
| Cat Fractionator Bottoms Inspections: | | | |
| Gravity, °API | 1.1 | 4.9 | −0.3 |
| Viscosity at 210° F., SUS | 74.2 | 60.7 | 72.6 |
| ASTM Distillation,[3] °F.: | | | |
| I.B.P | 494 | 514 | |
| 5% | 631 | 693 | 582 |
| 10% | 728 | 751 | 683 |
| 20% | 774 | 787 | 742 |
| 30% | 809 | 810 | 780 |
| 40% | 850 | 832 | 806 |
| 50% | 860 | 860 | 838 |
| 60% | 888 | 884 | 860 |
| 70% | 905 | 902 | 888 |
| 80% | | | 933 |
| 90% | | | 1,012 |
| BMCI [4] | 115 | 101 | 121 |

[1] Percent of carbon atoms in aromatic ring structures.
[2] Percent of carbon atoms in naphthene ring structures.
[3] ASTM Method D 1160. Distillation carried out at 10 mm. Hg absolute pressure. Observed temperatures corrected to 760 mm.
[4] U.S. Bureau of Mines Correlation Index $$\text{BMCI} = 100\left[\frac{876}{50\% \text{ B. Pt. (°F.)} + 460} + \frac{670}{131.5 + °\text{API}} - 4.568\right]$$

Table 3A gives the boiling ranges, yields and BMCI's of the carbon black feed products. These data illustrate the beneficial effect of thermal cracking in increasing the yield of 130 BMCI oil. The data also show that a catalytic cracker fractionator bottoms fraction with a BMCI lower that about 100 is of marginal quality for making 130 BMCI carbon black feedstock.

TABLE 3A.—YIELD AND BMCI OF CARBON BLACK FEED DISTILLATES FROM CAT FRACTIONATOR BOTTOMS [1]

| | Cat Fractionator Bottoms | | | | | | | | | | | |
|---|---|---|---|---|---|---|---|---|---|---|---|---|
| | A | | | | B | | | | C | | | |
| | BMCI | | | | | | | | | | | |
| | 115 | | | | 101 | | | | 121 | | | |
| | Maximum Processing Temperatures, °F.[2] | | | | | | | | | | | |
| | 800 | | 900 | | 800 | | 900 | | 600 | | 800[3] | |
| Carbon Black Feed Fraction: | | | | | | | | | | | | |
| Boiling Range, °F | 870/1,000 | 850/1,050 | 850/1,000 | 810/1,050 | 930/1,000 | 900/1,050 | 920/1,000 | 890/1,050 | 830/1,000 | 740/1,050 | 850/1,000 | 800/1,000 |
| BMCI | 130 | 130 | 130 | 130 | 130 | 130 | 130 | 130 | 130 | 130 | 135 | 135 |
| Yield, LV Percent of Cat Fractionator Bottoms | 28.5 | 47.0 | 40.0 | 62.0 | 14.5 | 29.5 | 16.5 | 31.5 | 42.5 | 67.5 | 35.7 | 37.5 |

[1] Interpolated and extrapolated data.
[2] Heated to temperature shown for a few minutes to simulate heating to fractionation temperature in a pipestill furnace.
[3] Plant test run data.

Table 3A is a summary of data and shows the yields of carbon black feedstocks having the same BMCI (130), but different boiling ranges, which can be obtained from cat fractionator bottoms derived from high severity cracking. Inspections of the cat fractionator bottoms used in these experiments are shown in Table 2.

The last two columns of Table 3A are a comparison of the results of a plant test run using cat fractionator bottoms C and data obtained in the laboratory.

TABLE 3B.—YIELD AND BMCI OF CARBON BLACK FEED DISTILLATES FROM CAT FRACTIONATOR BOTTOMS

[Laboratory data]

| Cat Fractionator Bottoms: | | | | | |
|---|---|---|---|---|---|
| Sample | A | | B | | C |
| BMCI | 115 | | 101 | | 121 |
| Maximum Processing Temperature, °F.[1] | 800 | 900 | 800 | 900 | 600 |
| Carbon Black Feed Fraction: | | | | | |
| Boiling Range, °F | 840/1,055 | 815/1,021 | 935/1,000 | 914/1,000 | 848/975 |
| BMCI | 132 | 130 | 138 | 131 | 128 |
| Yield, LV Percent of Cat Fractionator Bottoms | 43.1 | 50.3 | 10.6 | 19.0 | 34.9 |

[1] Heated to temperature shown for a few minutes to simulate heating to fractionation temperature in a pipestill furnace.

Table 3B contains some raw laboratory data which are not quite as illustrative of the results which would be obtained by application of the invention as those in Table 3A because of the different final boiling points and the different BMCI's of the carbon black feedstocks obtained.

In a laboratory distillation of another sample of catalytic fractionator bottoms from high severity catalytic cracking (70% conversion) the yield of carbon black feed having a boiling range of 850/965° F. was 28.1 LV percent of the catalytic fractionator bottoms. The carbon black feed had an API gravity of −4.4°, a viscosity at 210° F. of 102 SUS and a BMCI of 135.

A plant test run was carried out to obtain sufficient carbon black feedstock product for evaluation in a plant scale test to make carbon black. In the plant test a furnace and a vacuum fractionating tower were used and the carbon black feedstock was recovered as a side stream from the fractionating tower.

The catalytic fractionator bottoms fraction used as feed to the furnace was 1520 barrels of sample C in Table 2 and this feed was heated to 800° F. coil outlet temperature and fractionated at an absolute pressure of 30 mm. Hg. About 570 barrels of carbon black feed distillate (37.5 LV percent of the feed) was recovered as a side stream boiling at 800–1000° F. The side stream had a BMCI of 135. Inspections of two tank car lots of this oil feed are shown in the following Table 4.

TABLE 4.—INSPECTIONS OF CARBON BLACK FEEDSTOCK FROM PLANT TEST RUN

[Feed: Cat Fractionator Bottoms C] [1]

| | Tank Car 1A | Tank Car 1B |
|---|---|---|
| Gravity, °API | −4.7 | −4.3 |
| Viscosity at 210° F., SUS | 137.4 | 131.6 |
| Pour Point, °F | 130 | 135 |
| Carbon, wt. percent | 89.7 | 91.0 |
| Hydrogen, wt. percent | 7.78 | 7.75 |
| Sulphur, wt. percent | 1.94 | 1.91 |
| Ash, wt. percent | Nil | Nil |
| Asphaltenes, wt. percent | 1.3 | 1.7 |
| H/C Atomic Ratio | 1.04 | 1.02 |
| Distillation, °F.:[2] | | |
| I.B.P. | | |
| 5% | 782 | 777 |
| 10% | 830 | 823 |
| 20% | 855 | 854 |
| 30% | 866 | 864 |
| 40% | 880 | 878 |
| 50% | 892 | 895 |
| 60% | 905 | 906 |
| 70% | 918 | 916 |
| 80% | 948 | 945 |
| 90% | 990 | 982 |
| 95% | 1,028 | 1,018 |
| BMCI | 137 | 134 |

[1] Inspections given in Table 2.
[2] Distillation at 10 mm. Hg. Temperatures corrected to 760 mm. Hg.

The two tank cars of oil were burned in a conventional carbon black furnace and gave carbon black having the desired particle size and structure as measured by oil absorption.

In commercial operation the catalytic bottoms fraction can be flashed at 750–900° F. and 30 mm. mercury absolute pressure.

Mixed gas oil feeds may be used in the severe catalytic cracking operation.

The yield of 130 BMCI oil increases with increased aromaticity of the catalytically cracked fractionator bottoms feed. The most aromatic fractionator bottoms is produced at catalytic cracking temperature above 925° F. and above 50% recycle on fresh feed.

Examples of high severity fluid catalytic cracking of virgin gas oil are given in the following Table 5. The gas oil feed was a mixed gas oil feed having the following characteristics.

TABLE 5.—EXAMPLES OF HIGH SEVERITY FLUID CATALYTIC CRACKING

[Mixed Virgin Gas Oil Feed]

| Feed Characteristics | 1 | 2 | 3 |
|---|---|---|---|
| Gravity, ° API | 24.3 | 24.2 | 24.2 |
| A R | 14.0 | 12.9 | 12.2 |
| N R | 37.3 | 35.0 | 35.5 |
| ASTM Distillation, ° F.: | | | |
| 2% | 412 | 481 | 534 |
| 5% | 616 | 649 | 646 |
| 10% | 660 | 681 | 674 |
| 20% | 714 | 728 | 713 |
| 30% | 741 | 763 | 747 |
| 50% | 788 | 817 | 800 |
| 70% | 842 | 868 | 852 |
| 80% | 873 | 908 | 893 |
| 90% | 911 | 972 | 956 |
| Operating Conditions: | | | |
| Reactor Temperature, ° F | 953 | 934 | 926 |
| Catalyst to Oil Ratio by wt | 8.1 | 6.0 | 8.8 |
| W./hr./w | 9.8 | 7.6 | 8.3 |
| Recycle, vol. percent of fresh feed | 70.7 | 54.5 | 50.0 |
| Recycle Temperature, ° F | 668 | 676 | 638 |
| Conversion (Corr. 430° F.) | 60.3 | 59.3 | 65.6 |
| Yields of Products, percent of fresh feed: | | | |
| Gas, C$_3$ and lighter, wt. percent | 9.0 | 6.9 | 9.6 |
| C$_4$'s, wt. percent | 6.3 | 7.1 | 9.2 |
| Gasoline, C$_5$–430° F., vol. percent | 47.1 | 46.7 | 51.6 |
| Heating Oil, 430°–650° F., vol. percent | 33.0 | 30.2 | 25.8 |
| Fractionator Bottoms, 650° F.+, vol. percent | 5.2 | 7.4 | 4.1 |
| Coke, wt. percent | 6.2 | 6.2 | 7.4 |

What is claimed is:

1. A method of preparing carbon black feedstock consisting essentially of the steps of catalytically cracking a gas oil at high severity of between about 60 and 70% conversion to gas and gasoline of 430° F. end point, fractionating the cracked products and recovering a 650° F.+bottoms fraction, vacuum distilling said 650° F.+bottoms fraction under a reduced pressure of about 30 mm. of mercury to recover an 800° F.–1050° F. side stream fraction having a BMCI of at least about 130.

2. A method according to claim 1 wherein said 650° F.+bottoms fraction is heated to a temperature between about 800° F. and 900° F. before said vacuum distillation step.

3. A method according to claim 1 wherein between about 15 and 70% of said 650° F.+bottoms fraction is recovered as carbon black feedstock.

4. A method for preparing carbon black feedstock consisting essentially of the steps of catalytically cracking a gas oil at high severity and a high conversion above about 55% conversion to gas and gasoline of 430° F. end point, fractionating the cracked products and recovering a 650° F.+bottoms fraction, vacuum distilling said 650° F.+bottoms fraction under a reduced pressure below about 100 mm. of mercury to recover as a side stream a fraction boiling between 700 and 1050° F. having a BMCI of at least about 130.

5. A method according to claim 4 wherein said 650° F.+bottoms fraction is heated to a temperature between about 800° F. and 900° F. before said vacuum distillation step.

6. A method according to claim 4 wherein between about 15 and 70% of said 650° F.+bottoms fraction is recovered as carbon black feedstock.

7. A method of preparing carbon black feedstock which comprises catalytically cracking a gas oil feed at a temperature of about 952° F., a high severity and a high conversion of about 65% to gas and gasoline of 430° F. end point, fractionating the cracked products and recovering a 700° F.+bottoms fraction, vacuum distilling said 700° F.+bottoms fraction under a reduced pressure of about 30 mm. of mercury to recover an 800° F.–1050° F. side stream fraction having a BMCI of at least about 130.

8. A method according to claim 4 wherein the high conversion to gas and gasoline includes 75% conversion.

References Cited

UNITED STATES PATENTS

| | | | |
|---|---|---|---|
| 2,764,527 | 9/1956 | Steele et al. | 208—73 |
| 2,895,895 | 7/1959 | Ridder et al. | 208—100 |
| 2,904,510 | 9/1959 | Service | 208—100 |

ABRAHAM RIMENS, *Primary Examiner.*

DELBERT E. GANTZ, *Examiner.*